United States Patent [19]
Schreiber et al.

[11] Patent Number: 4,706,384
[45] Date of Patent: Nov. 17, 1987

[54] TOOL FOR CUTTING COAXIAL CABLE

[75] Inventors: Karl R. Schreiber, New Lenox, Ill.;
Brian K. Harwood, Schererville, Ind.

[73] Assignee: Andrew Corporation, Orland Pk., Ill.

[21] Appl. No.: 893,250

[22] Filed: Aug. 5, 1986

[51] Int. Cl.[4] ............................................. B21F 13/00
[52] U.S. Cl. ....................................... 30/91.2; 30/90.1
[58] Field of Search ...................... 30/90.4, 90.3, 91.2, 30/90.1

[56] References Cited
U.S. PATENT DOCUMENTS 3,254,407  6/1966  Apa et al. .............................. 30/91.2
3,407,497 10/1968  Ratay ................................... 30/91.2

Primary Examiner—Paul A. Bell
Assistant Examiner—Willmon Fridie, Jr.
Attorney, Agent, or Firm—Stephen G. Rudisill

[57] ABSTRACT

The tool includes a fixture for locating a coaxial cable lengthwise in a predetermined position and for confining the tool to turn about the axis of the cable. Pivotally mounted on the fixture is a cutter arm having a pair of spaced blades positioned to cut the cable to two different depths at two axially spaced locations. After the cutter arm has been pivoted downwardly to an active position, the tool is rotated about the axis of the cable. As an incident thereto, one blade cuts an outer insulating jacket, an outer conductor and an inner insulating sheath away from an inner conductor while the other blade simultaneously cuts the outer insulating jacket away from the outer conductor at an axially spaced location.

12 Claims, 4 Drawing Figures

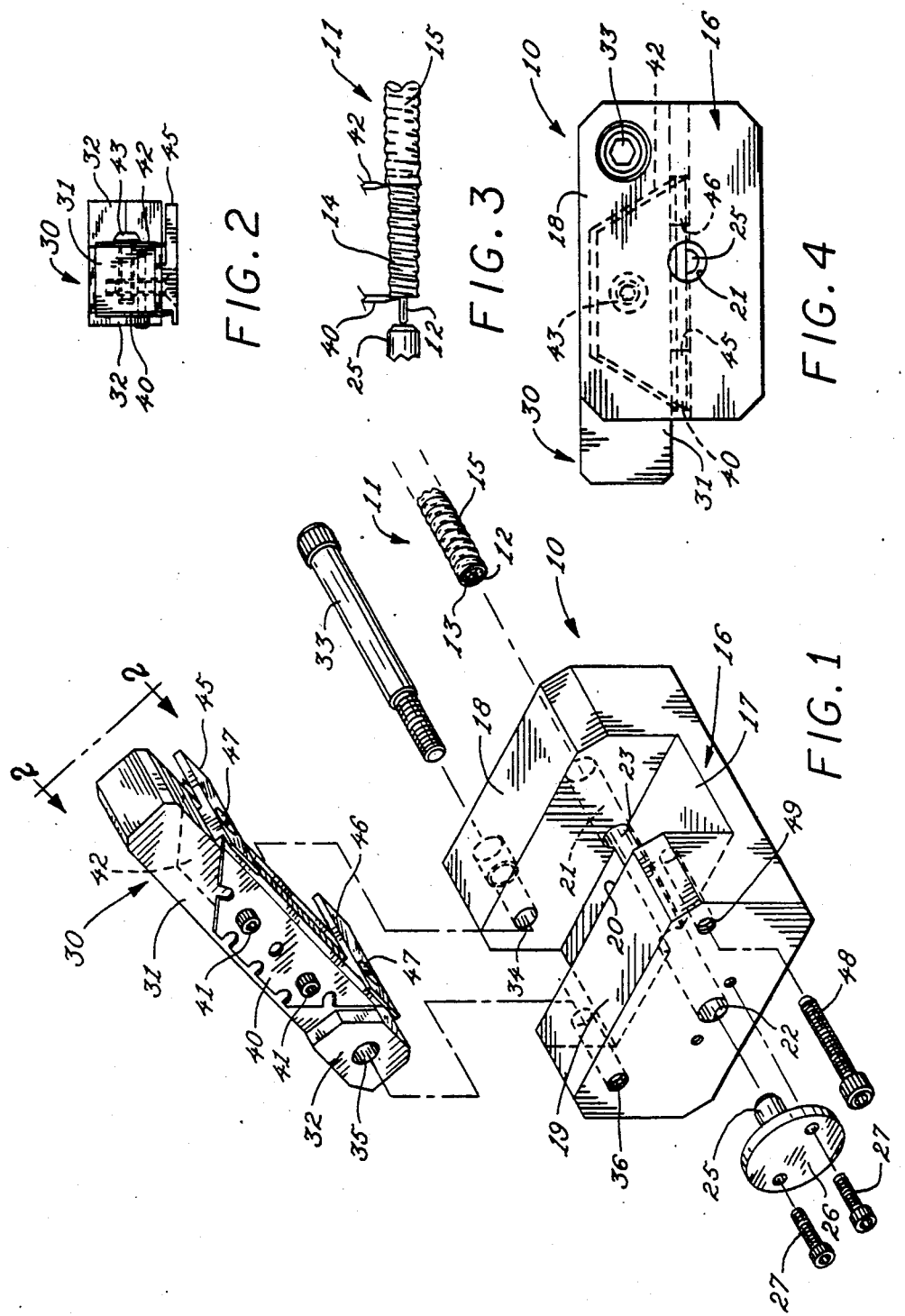

TOOL FOR CUTTING COAXIAL CABLE

BACKGROUND OF THE INVENTION

This invention relates to a tool for cutting and facilitating the stripping of elongated coaxial cable to enable a connector terminal to be attached to one end of the cable.

Most coaxial cable for carrying electrical signals comprises a center rod-like conductor surrounded by an inner insulating sheat which, in turn, is surrounded by an outer sheath-like conductor. In most cases, an outer insulating sheath surrounds the outer conductor.

In order to attach a connector terminal to the cable, it is necessary to cut the outer sheaths and strip the outer sheaths away from the center conductor at a predetermined distance from the end of the cable. It also is necessary to strip the extreme outer sheath off of the cable at some greater distance from the end of the cable. Cutting and stripping of the cable at accurate locations can be a time-consuming task.

SUMMARY OF THE INVENTION

The general aim of the present invention is to provide a new and improved tool which enables the cable to be stripped more quickly, easily and accurately than has been possible with prior tools used for the same general purpose.

Another object of the invention is to provide a cable cutting tool having basic components which may be used universally with other components to enable the cable to be stripped properly to accept different types of connector terminals.

A more detailed object of the invention is to provide a tool having a fixture for locating the cable lengthwise in a precisely predetermined position and having a novel cutter for cutting the cable to two different depths at two axially spaced locations as the tool is rotated about the axis of the cable.

The invention also resides in the relatively simple and inexpensive construction of the cable cutting tool.

These and other objects and advantages of the invention will become more apparent from the following detailed description when taken in conjunction with the accompanying drawings.

BRIEF DESCRIPTION OF THE DRAWINGS

FIG. 1 is an exploded perspective view of a new and improved cable cutting tool incorporating the unique features the present invention.

FIG. 2 is an elevational view of part of the tool as taken along the line 2—2 of FIG. 1.

FIG. 3 is a schematic view showing the cable being cut.

FIG. 4 is a side elevational view of the tool as viewed from the right of FIG. 1.

DETAILED DESCRIPTION OF THE PREFERRED EMBODIMENT

For purposes of illustration, the invention is shown in the drawings as incorporated in a tool 10 for cutting and facilitating the stripping of coaxial cable 11 of the type used to transmit electrical signals such as RF and microwave signals. The specific cable which has been illustrated is a ¼" round cable of the type sold by the assignee of the present invention under the trade designation HELIAX foam-dielectric cable.

The illustrated cable 11 comprises a center conductor 12 made of stiff copper wire and surrounded by foam-dielectric insulating sheath 13 (FIG. 1). Surrounding the inner sheath 13 is an outer sheath-like conductor 14 (FIG. 3) made of rigid corrugated copper. An outer insulating sheath or jacket 15 made of polyethylene covers the outer conductor 14.

In order to attach a connector terminal (not shown) to the end of the cable 11, it is necessary to cut through certain portions of the cable and to strip those portions off of the cable. In the specific cable 11 which has been illustrated, the outer jacket 15, the outer conductor 14 and the inner insulating sheath 12 are cut and stripped so as to expose approximately 3/16" of the inner conductor 12 at the end of the cable (see FIG. 3). In addition, the outer jacket 15 is cut and stripped at an axially spaced location in order to expose approximately a ¾" length of the outer conductor 14.

The present invention contemplates the provision of a new and improved tool 10 which enables the cable 11 to be cut quickly and accurately to two different depths at two axially spaced locations so as to facilitate quick and easy stripping of the cable. Moreover, certain basic components of the tool are constructed so as to be capable of being used universally with other components so as to enable multiple tools for performing different stripping operations to be manufactured in a relatively inexpensive manner.

More specifically, the tool 10 comprises a fixture 16 having a flat and horizontal base 17 with a pair of spaced ears 18 and 19 projecting upwardly therefrom. The base and the ears coact to define an upwardly opening space or pocket 20 of generally U-shaped cross-section.

The fixture serves to locate the end of the cable 11 in a predetermined position while the cable is being cut. For this purpose, a horizontally extending hole 21 which is just slightly larger in diameter than the cable is formed through the ear 18 midway between the front and rear ends of the ear and adjacent the upper side of the base 17. A hole 22 of the same diameter is alined with the hole 21, is formed in the ear 19 and preferably extends completely through the ear 19. The cable is adapted to be threaded endwise through the hole 21, across the pocket 20 and into the hole 22. The cable is cradled in an upwardly opening groove 23 formed in the upper side of the base 17, the groove being radiused on the same diameter as the holes.

Pursuant to one aspect of the invention, a stop 25 is positioned in the hole 22 and engages the end of the cable 11 to locate the cable lengthwise in the fixture 16. Herein, the stop is in the form of a cylindrical stud having a predetermined length shorter than the length of the hole 22. Integral with the outer end of the stud 25 is a flange or disc 26 which is releasably secured to the outboard side of the ear 19 by screws 27. By removing the screws, the stud 25 may be detached from the fixture 16 and replaced with a stud of a different length. As will become more apparent subsequently, the length of the stud determines the length of the exposed portion of the inner conductor 12 when the cable 11 is cut and stripped.

Further in carrying out the invention, the tool 10 includes a manually operable cutter 30 which, when operated, serves to cut the cable 11 at two axially spaced locations and to two different depths. In the present instance, the cutter includes a blade holder 31 in the form of an elongated lever or arm having a lateral width somewhat less than the spacing between the ears 18 and 19. Spacer blocks 32 are formed integrally with the rear end portion of the arm 31 on opposite sides thereof and project into close face-to-face relation with the inboard sides of the ears. A horizontal pivot rod 33 with a threaded end portion extends through a hole 34 in the rear end portion of the ear 18 through a hole 35 in the rear end portion of the arm 31 and is threaded into a hole 36 in the rear end portion of the ear 19. The pivot rod 33 mounts the cutting arm 31 to pivot downwardly from an inactive position to an active position (FIG. 4). When in its active position, the arm extends horizontally and is disposed within the pocket 20 between the ears 18 and 19.

A razor blade 40 is located on one side (i.e., the left side in FIG. 1) of the cutter arm 31 and is secured detachably thereto by two screws 41 which extend through two spaced holes in the blade and are threaded into tapped holes in the arm. An identical blade 42 is detachably secured to the other side of the arm 31 by a single screw 43 (FIG. 2) which extends through a center hole in the blade 42 and is threaded into another tapped hole in the arm. The edges of the two blades project downwardly below the lower surface of the arm 31. In keeping with the invention, the edge of the blade 40 projects downwardly beyond the arm by a greater distance than the edge of the blade 42 (see FIG. 3) so as to enable the blade 40 to cut into the cable 11 to a greater depth than the blade 42. This is achieved by locating the tapped holes for the blade-holding screws 41 a predetermined distance below the tapped hole for the blade-holding screw 43. In addition, two stops or pads 45 and 46 are located beneath the front and rear end portions, respectively, of the blades 40 and 42. Each pad is secured to the underside of the cutter arm 31 by a screw 47 and is in the form of a thin plate which is appropriately shaped to engage the end portions of the edges of the blades. The pads serve as positive stops against the blades so as to prevent the blades from cutting into the cable beyond a predetermined depth even though there may be loose tolerances between the blades and the screws 41, 43.

The arm 31 may be latched releasably by a screw 48 (FIG. 1) threaded into a hole 49 in the forward portion of the ear 19 and adapted, when tightened, to overlie the upper side of the left end portion of the pad 45. The screw prevents the cutter arm 31 from swinging full open while the tool 10 is being used or transported from place-to-place but permits the arm to be swung upwardly for purposes of changing the blades 40 and 42. The screw is spaced sufficiently far above the pad 45 to enable the blades to clear the cable 11 when the screw is latched and the arm is pivoted upwardly.

To use the tool 10, the end portion of the cable 11 is threaded through the hole 21 in the ear 18, through the groove 23 in the base 17 and into the hole 22 in the ear 19 while the cutter arm 31 is pivoted upwardly away from the cable. When the end of the cable engages and stops against the end of the stud 25, the cable is automatically located in the proper lengthwise position for cutting.

After the cable 11 has been located by the fixture 16, the arm 31 is pivoted downwardly until stopped by virtue of the lower side of the arm engaging the outer diameter of the cable. As an incident to downward movement of the arm, the blade 40 cuts into the cable 11 at a short distance (e.g., 3/16″) from the end thereof and cuts to a depth sufficient to penetrate the outer insulating jacket 15, the outer conductor 14 and the inner insulating sheath 13 without contacting the inner conductor 12 (see FIG. 3). At the same time, the blade 42 cuts into the cable at an axially spaced point (e.g., a point spaced ¾″ from the point of engagement of the blade 40) but cuts to a depth which is sufficient only to penetrate the outer jacket 15.

After the arm 31 has been pivoted downwardly to its active position, downward pressure is maintained against the arm and, at the same time, the tool 10 is turned about the axis of the cable, the cable being confined during such turning by the holes 21 and 22 and by the groove 23. As the tool is turned, the blade 40 makes an annular cut in the outer jacket 15, the outer conductor 14 and the inner sheath 13. The blade 42 simultaneously makes an axially spaced annular cut in the jacket 15. After such cuts have been made, the arm 31 is pivoted away from the cable to permit the cable to be pulled out of the holes 21 and 22. The cut portions of the cable then may be stripped away by hand.

From the foregoing, it will be apparent that the present invention brings to the art a new and improved tool 10 which effects quick and accurate cutting of the cable 11 to facilitate easy stripping of the cable. By replacing the stud 25 with a longer or shorter stud, a shorter or longer portion, respectively, of the inner conductor 12 may be exposed during the cutting and stripping operation. The length of the outer jacket 15 cut by the blade 12 may be changed simply by replacing the arm 31 with a similar arm having a left blade located identically to the left blade 40 of the arm 31 but having a right blade spaced a different distance from the left blade. Thus, the tool 10 may be easily changed over to cut the cable in different manners so as to enable the cable to accept different connector teminals. Alternatively, standard fixtures 16 may be used with various different studs and arms so that only fixtures of universal design need be manufactured.

Those familiar with the art will appreciate that the tool 10 may be used to cut coaxial cables other than a cable 11 of the type which has been specifically illustrated. For example, some coaxial cables do not include an outer insulating jacket 15 and, in such a case, the blade 42 may be used simply to cut an outer conductor away from an inner insulating sheath. Also, it will be appreciated that cutting of the cable may be effected by turning the cable about its own axis while holding the tool stationary rather than by physically turning the tool about the axis of the cable.

We claim

1. A tool for facilitating the stripping of elongated coaxial cable of generally circular cross-section and having a center conductor surrounded by an inner insulating sheath which, in turn, is surrounded by an outer sheath, said tool being operable to cut both through said outer and inner sheaths at a predetermined distance from one end of said cable and being operable to cut through said outer sheath at a greater distance from said one end of said cable, said tool comprising, in combination, a fixture having a base and having first and second ears spaced from one another and projecting upwardly from said base whereby an upwardly opening pocket of generally U-shaped cross-section is defined between said ears, means on said first ear and said base for confining said tool and siad cable for relative rotation about the axis of the cable, adjustable means on said second ear for engaging one end of said cable and adjustably locating said cable in a predetermined lengthwise position in said pocket, a blade holder supported by said fixture to move between active and inactive positions, said blade holder having first and second spaced blades which are located adjacent said first and second ears, respectively, when said holder is in said active position, and means locating said blades on said holder and causing said second blade to cut into said cable to a greater depth than said first blade when said holder is moved to said active position.

2. A tool as defined in claim 1 in which said confining means comprise a hole formed through said first ear and further comprise an upwardly opening groove formed in said base.

3. A tool for facilitating the stripping of elongated coaxial cable of generally circular cross-section and having a center conductor surrounded by an inner insulating sheath which, in turn, is surrounded by an outer sheath, said tool being operable to cut both through said outer and inner sheaths at a predetermined distance from one end of said cable and being operable to cut through said outer sheath at a greater distance from said one end of said cable, said tool comprising, in combination, a fixture having first and second ears spaced from one another whereby a space is defined between said ears, a first hole extending through said first ear, a second hole formed in said second ear and alined with said first hole, said holes being approximately the same diameter as said cable whereby said cable may be threaded through said first hole, threaded along a path extending across said space and then threaded into said second hole, detachable means adjacent said second hole for engaging said one end of said cable and stopping said one end in a predetermined position as said cable in is threaded into said second hole, a blade holder supported by said fixture to move between active and inactive positions, said holder being located within said space when said holder is in said active position and having first and second blades which are disposed adjacent said first and second ears, respectively, when said holder is in said active position, said blades being spaced from said path when said holder is in said inactive position thereby to permit threading of said cable along said path, and means locating said blades on said holder and causing said second blade to cut into said cable to a greater depth than said first blade when said holder is moved to said active position.

4. A tool as defined in claim 3 in which said second hole extends completely through said second ear, said engaging means comprising a stud located in said second hole and detachably conected to said second ear.

5. A tool as defined in claim 4 further including a flange rigid with one end of said stud and detachably connected to one side of said second ear.

6. A tool as defined in claim 3 in which said space opens upwardly and is generally U-shaped in cross-section, said blade holder comprising a lever arm mounted on said fixture to swing upwardly and downwardly about a generally horizontal pivot axis extending across said space.

7. A tool as defined in claim 6 further including stop means on said blade holder and engaging portions of the cutting edges of said blades.

8. A tool as defined in claim 7 in which said stop means comprise a pair of stops secured to said blade holder and located on opposite sides of said cable when said blade holder is in said active position.

9. A tool as defined in claim 6 in which said first and second blades are identical and each is formed with a hole, first and second screws extending through the holes in said first and second blades, respectively, and first and second threaded holes in opposite sides of said blade holder and receiving said first and second screws, respectively, said second threaded hole being located below said first threaded hole so as to cause said second blade to cut into said cable to a greater depth than said first blade.

10. A tool for facilitating the stripping of elongated coaxial cable of generally circular cross-section and having a center conductor surrounded by an inner insulating sheath which, in turn, is surrounded by an outer tubular conductor surrounded by an outer insulating sheath, said tool being operable to cut through said insulating sheaths and said outer conductor at a predetermined distance from one end of said cable and being operable to cut through only said outer insulating sheath at a greater distance from said one end of said cable, said tool comprising, in combination, a fixture having a base and having first and second ears spaced from one another and projecting upwardly from said base whereby an upwardly opening space of generally U-shaped cross-section is defined between said ears, first and second alined holes extending horizontally through said first and second ears, respectively, said holes being approximately the same diameter as said cable whereby said cable may be threaded through said first hole, threaded along a path extending across said space and then threaded into said second hole, a stud detachably secured to said second ear and extending into said second hole, said stud engaging said one end of said cable and stopping said one end in a predetermined position in said second hole as said cable is threaded into said second hole, a blade holder pivotally mounted on said fixture to swing upwardly and downwardly between said ears from an upper inactive position to a lower active position, said holder being located within said space when said holder is in said active position, said holder having first and second detachable blades extending transversely across said path and located adjacent the inboard sides of said first and second ears, respectively, when said holder is in said active position, said blades being spaced upwardly from said path when said holder is in said inactive position thereby to permit threading of said cable along said path, and means locating said blades on said holder and causing said second blade to cut into said cable to a greater depth than said first blade when said holder is swung downwardly to said active position.

11. A tool as defined in claim 10 in which said first and second blades are identical and each is formed with a hole, first and second screws extending through the holes in said first and second blades, respectively, and first and second threaded holes in opposite sides of said blade holder and receiving said first and second screws, respectively, said second threaded hole being located below said first threaded hole so as to cause said second blade to cut into said cable to a greater depth than said first blade.

12. A tool as defined in claim 11 further including a pair of stops secured to said blade holder and located on opposite sides of said cable when said blade holder is in said active position, said stops engaging portions of the cutting edges of said blades.

\* \* \* \* \*